US012687969B2

(12) United States Patent
Khalid et al.

(10) Patent No.: US 12,687,969 B2
(45) Date of Patent: Jul. 21, 2026

(54) SELECTING A STORAGE ARRAY FOR DATA STORAGE BASED ON ANTICIPATED ENERGY SAVINGS FOR THAT STORAGE ARRAY

(71) Applicant: Dell Products L.P., Round Rock, TX (US)

(72) Inventors: Ahmed Khalid, Cork (IE); Aidan O'Mahony, Cork (IE); Alan Barnett, County Cork (IE); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/421,824

(22) Filed: Jan. 24, 2024

(65) Prior Publication Data

US 2025/0238150 A1      Jul. 24, 2025

(51) Int. Cl.
*G06F 3/06* (2006.01)

(52) U.S. Cl.
CPC .......... *G06F 3/0625* (2013.01); *G06F 3/0638* (2013.01); *G06F 3/0673* (2013.01)

(58) Field of Classification Search
CPC ..... G06F 3/0625; G06F 3/0638; G06F 3/0673
See application file for complete search history.

(56) References Cited

U.S. PATENT DOCUMENTS

| | | | | |
|---|---|---|---|---|
| 2018/0203628 | A1* | 7/2018 | Oderov | G06F 3/0653 |
| 2019/0286350 | A1* | 9/2019 | Yoo | G06F 11/3062 |
| 2023/0125240 | A1* | 4/2023 | Wang | G06F 3/0631 |
| | | | | 711/154 |
| 2024/0361940 | A1* | 10/2024 | Hosoya | G06F 3/061 |
| 2025/0068340 | A1* | 2/2025 | Hassan | G06F 3/0679 |

FOREIGN PATENT DOCUMENTS

| | | | | |
|---|---|---|---|---|
| EP | 3905424 | A1 * | 11/2021 | H01M 10/48 |

OTHER PUBLICATIONS

"Machine Learning Models", Jan. 7, 2023, pp. 1-15, https://www.databricks.com/glossary/machine-learning-model#:~:text=The%20of%20running%20a,the%20trained%20machine%20learning%20model. (Year: 2023) (Year: 2023).*
R. C. Shah and J. M. Rabaey, "Energy aware routing for low energy ad hoc sensor networks," 2002 IEEE Wireless Communications and Networking Conference Record. WCNC 2002 (Cat. No. 02TH8609), Orlando, FL, USA, 2002, pp. 350-355 vol. 1, doi: 10.1109/WCNC.2002.993520.

* cited by examiner

*Primary Examiner* — Raymond N Phan

(74) *Attorney, Agent, or Firm* — Workman Nydegger

(57) ABSTRACT

One example method includes receiving, by a TEA (trustworthy energy awareness) module, a request from a storage controller to identify a most energy-efficient storage array, as among a plurality of storage arrays, on which to store a set of data, determining, by the TEA module based on energy efficiency information and user constraints, the most energy efficient storage array, and identifying, by the TEA module to the storage controller, the most energy efficient storage array.

18 Claims, 3 Drawing Sheets

SELECTING A STORAGE ARRAY FOR DATA STORAGE BASED ON ANTICIPATED ENERGY SAVINGS FOR THAT STORAGE ARRAY

FIELD OF THE INVENTION

Embodiments of the present invention generally relate to mechanisms for storing data, according to various criteria. More particularly, at least some embodiments of the invention relate to systems, hardware, software, computer-readable media, and methods, for referencing energy awareness when determining where data will be stored.

BACKGROUND

The phrase 'energy aware' is sometimes used to refer to a system that is able to take into consideration the energy consumption of the devices or components involved in its operation. Energy aware systems may involve techniques such as energy-efficient processing, data compression, or data migration, among others, to optimize energy consumption while still meeting the performance requirements of the network. In storage systems, data may be placed on different storage arrays or locations, based on the user requirements, SLAs (service level agreements), and system state. However, a significant challenge remains, namely, placing data in a trustworthy energy aware manner, while also meeting other applicable constraints such as SLAs.

In more detail, conventional approaches that aim to reduce energy consumption for data placement generally rely on limited metadata from local servers and lack comprehensive data from energy providers to make accurate predictions. Furthermore, these approaches cannot confidently operate in decentralized environments due to lack of a single or central authority.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
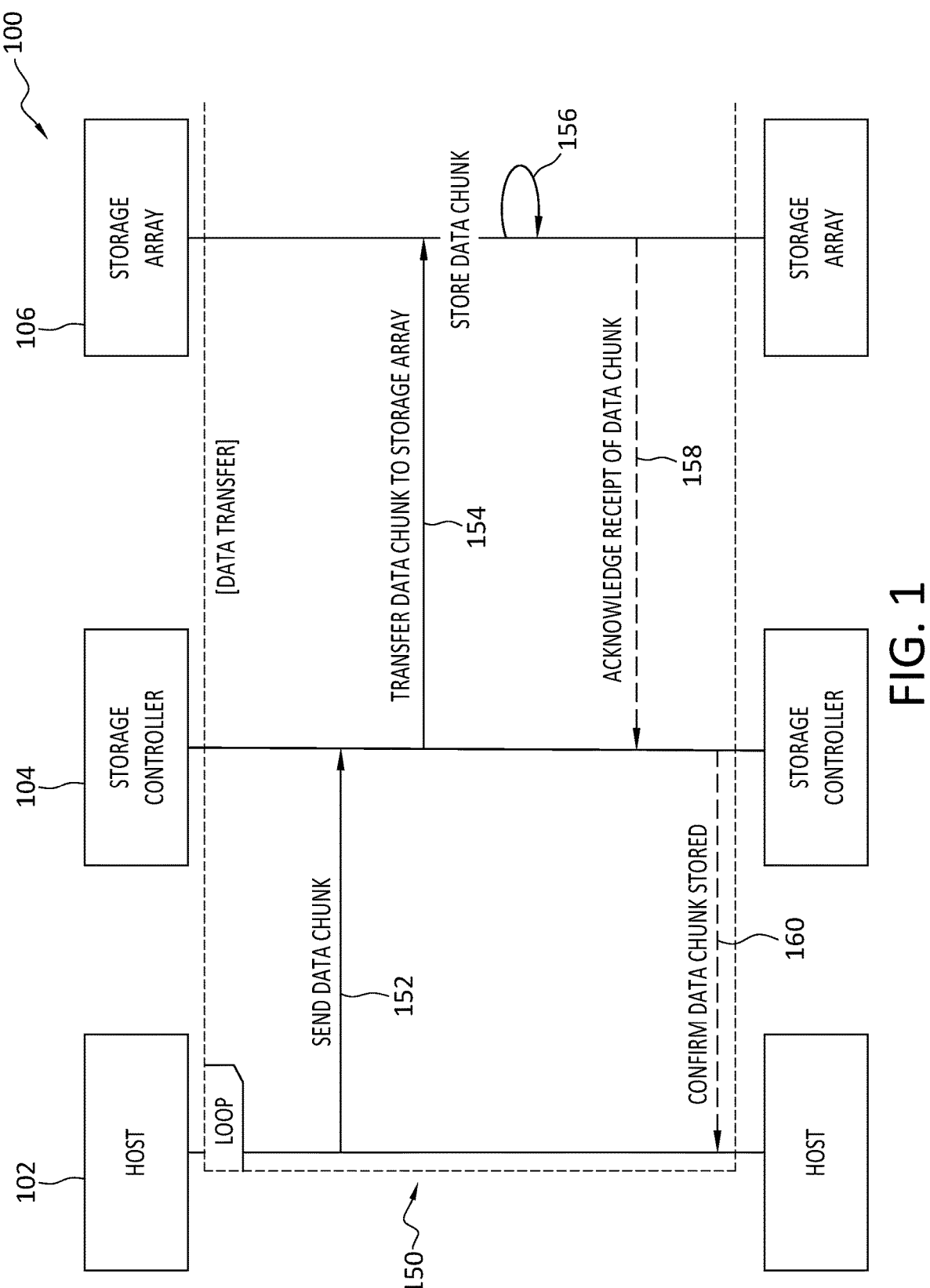
FIG. 1 discloses aspects of a comparative example for illustrating aspects of one embodiment.

Embodiments of the present invention generally relate to mechanisms for storing data, according to various criteria. More particularly, at least some embodiments of the invention relate to systems, hardware, software, computer-readable media, and methods, for referencing energy awareness when determining where data will be stored.

One example embodiment is directed to a method that operates to place data based on various considerations, one example of which is energy-awareness. This example method may comprise the following operations: sending, by a host, a request to place data on a storage array; receiving, by a storage controller, the request from the host; forwarding, by the storage controller, the request to a TEA (trustworthy energy awareness) module; using, by the TEA module, energy statistics and other information to identify a storage location that meets, or most closely meets as among a group of storage locations, the application constraints; sending, by the TEA module to the storage controller, information identifying the storage location; and, transferring, by the storage controller, the data to the identified storage location.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that energy-related considerations, such as energy efficiency of a storage array, may play a decisive role in data placement decisions. An embodiment may enable a data owner to realize a cost savings, relative to conventional approaches, for storage of its data. An embodiment may incentivize the use of energy-efficient data storage platforms. Various other advantages of some example embodiments will be apparent from this disclosure.

A. Aspects of Some Example Operating Environments for an Embodiment

The following is a discussion of some aspects of one or more example operating environments for an embodiment. This discussion is not intended to limit the scope of the invention, or the applicability of the embodiments, in any way. In general, embodiments of the invention may be implemented in connection with systems, software, and components, that individually and/or collectively implement, and/or cause the implementation of, data storage operations.

At least some embodiments of the invention provide for the implementation of the disclosed functionality in connection with existing data storage platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment. Some example cloud storage environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud environment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Finally, example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Aspects of a Comparative Example

The following is a discussion of some aspects of a comparative example, presented for the purpose of facilitating the illustration of various aspects of one example embodiment. This discussion is not intended to limit the scope of the invention, or the applicability of the embodiments, in any way.

With reference now to FIG. 1, an architecture 100 is shown that includes various entities, namely, a host 102, a storage controller 104, and a storage array 106, each of which may communicate with the others. A method 150 implemented in the architecture 100 may begin with the transmission 152 of a data chunk from the host 102 to the storage controller 104. The storage controller 104, in turn, may transfer 154 the data chunk to the storage array 106, which may then store 156 the data chunk.

After the data chunk has been stored 156, the storage array 106 may then acknowledge 158, to the storage controller 104, receipt of the data chunk. Finally, the storage controller 104 may confirm 160 to the host 102 that the data chunk has been stored.

As illustrated by this comparative example of FIG. 1, no provision is made for the collection, or use, of energy-related information, such as energy consumption for example, in the selection of the storage array 106 as the destination for the data chunk. Rather, the comparative method 150 is performed in a simple loop form uninformed or influenced by energy-related considerations. In contrast, and as discussed below, an example embodiment may consider, for example, expected energy consumption by a storage array, when making determinations as to where data should be stored.

C. Overview of Aspects of an Example Embodiment

One example embodiment may comprise, and/or employ, a TEA module to enable data placement operations, implemented in an energy efficient way, in a distributed storage environment that may comprise multiple data owners and storage providers. In general, a TEA framework according to an embodiment may comprise one or more modules that perform smart predictions and calculations to choose the best, with respect to energy consumption for example, storage location. One embodiment comprises a method for such storage array evaluation and data storage processes. One particular embodiment may be implemented in the Dell PowerMax data storage platform, although that is not required.

In brief, a method according to one embodiment may be as follows. A request from a host to place data on a storage array may be handled by a storage controller. The storage controller may be generally responsible for determining data storage requirements and identifying an available array or location that meets those data storage requirements. In an embodiment, the storage controller forwards a request for placing a data chunk from a host to a TEA module, using the appropriate API calls. The TEA module runs its calculation modules and uses energy statistics, possibly along with confidence scores, to identify a data storage location that meets applicable requirements, constraints, and SLAs, while also maximizing user objectives. The result, that is, the identification of the selected data storage location, is sent to the storage controller, which transfers the data chunk to the storage location. In an embodiment, the storage location may be one which is most energy-efficient, as among a group of possible storage locations. As used herein, 'energy efficient' embraces, but is not necessarily limited to, the least amount of energy consumed and/or lowest cost of energy, such as per unit of data stored. The aforementioned process may be repeated for subsequent data chunks, so as to possibly ensure that all the data is placed using trustworthy energy-aware calculations, and/or using information indicating the most energy efficient storage. Thus, an embodiment may comprise a combination of trustworthiness of energy awareness, and data placement in a storage location as may be dictated by the energy awareness information.

D. Detailed Discussion of Aspects of an Example Embodiment

Figure 2:
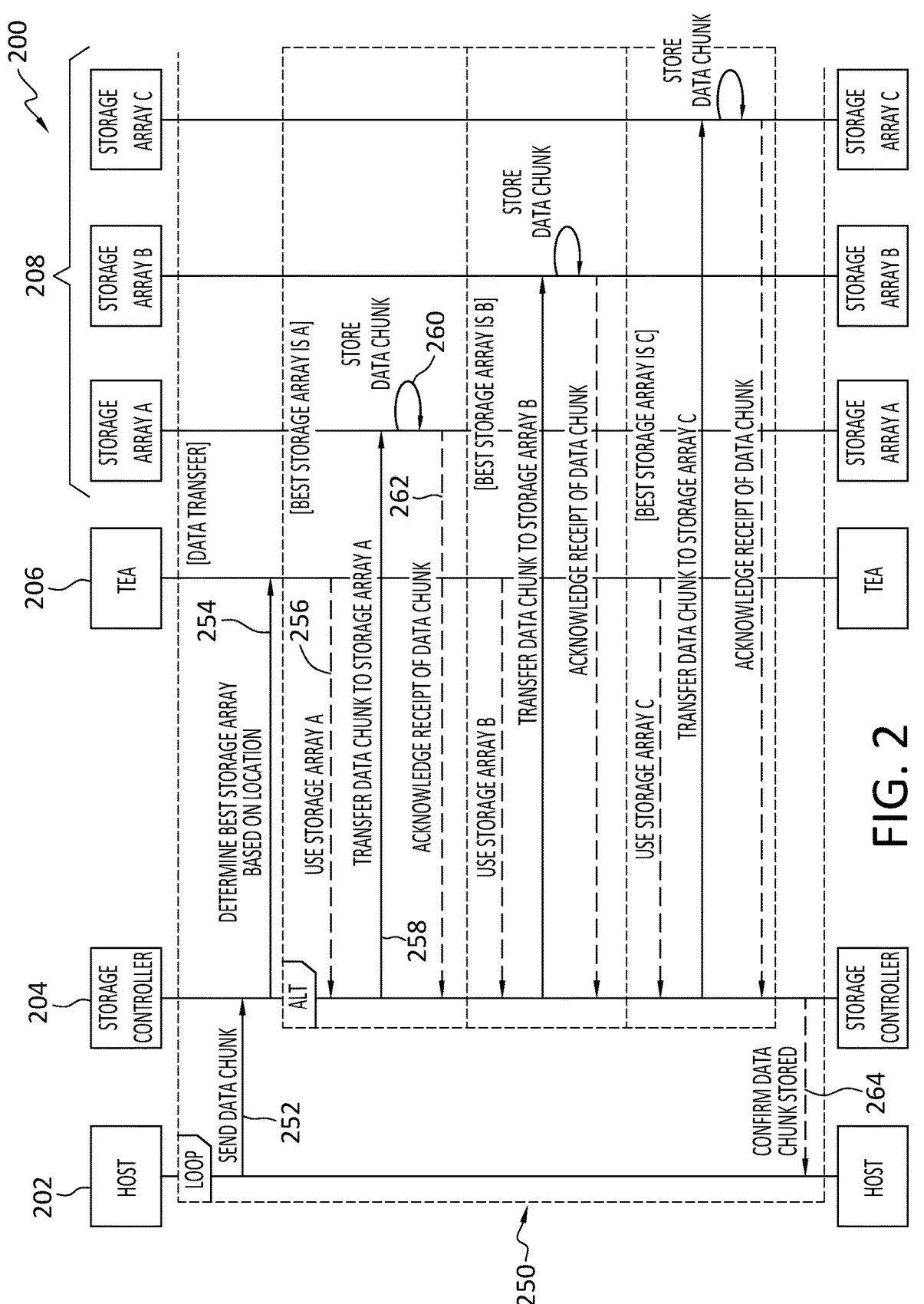
FIG. 2 discloses aspects of an architecture and method according to one embodiment.

With reference now to FIG. 2, an architecture 200, and method 250, according to one or more embodiments, are disclosed. In the example of FIG. 2, the architecture 200 comprises a host 202, storage controller 204, TEA (trustworthy energy awareness) module 206, and various storage arrays 208. Any of the aforementioned components may receive/transmit data and/or information and metadata from/ to any of the other aforementioned components. In an embodiment, the host 202, storage controller 204, and TEA module 206 may be co-located at a common site, although that is not required. In an embodiment, the storage controller 204 and TEA module 206 may be co-located at a common site with one or more of the storage arrays 208, although that is not required. In an embodiment, the host 202, storage controller 204, TEA module 206, and storage arrays 208, may all be co-located at a common site.

D.1 Example TEA Module According to an Embodiment

In an embodiment, the TEA module 206 may comprise an ML (machine learning) model that may be trained, using a training data set, to draw inferences based on input received. Example training data, and/or inputs to the ML model, may include, but are not limited to, information concerning one or more storage arrays, such as: historical energy consumption information, and associated financial costs; rated energy efficiency; observed energy efficiency; and, observed energy efficiency trend information over time, and/or with respect to differing data storage operation sizes (volume of data) and volumes (number of write operations per unit time). In an embodiment, these inputs and/or training data may be obtained from various sources including, but not limited to, a storage array vendor, and trusted sources such as the storage array itself. Other inputs and/or training data for the ML model may comprise customer requirements, constraints, SLA terms, and user objectives.

For example, a customer may specify that it only wants to use block storage, rather than object storage, for a certain dataset. This input may be used by the ML model in the drawing of inferences. Moreover, a customer may identify priorities as among its various requirements and conditions. For example, the top customer priority may be to use block storage, with the next priority being energy efficiency. In this example then, the ML model may identify the most energy efficient block storage platform, even though there may be, for example, an object storage platform that is more energy efficient than the block storage platform. Thus, in this example, the block storage platform is the most energy efficient storage platform, given the other constraints that have been applied.

In an embodiment, the ML model may draw various inferences based on the input(s) provided to the ML model. For example, the ML model may predict which storage array, among a group of storage arrays, may be expected to provide the most energy efficient storage array, as among the group of storage arrays, for storing a particular dataset identified by a host in a request for data storage. Moreover, during and after storage of the data in the identified, or predicted, storage array, the ML model may receive feedback from the storage array in the form of energy efficiency information, relating to the selected storage array, that may be used by the ML model to generate future inferences.

In an embodiment, comparisons may be drawn between a prediction made by the ML model, and the actual outcome. For example, an ML model may predict that a particular storage array will provide the most energy efficient operation but, in practice, it may turn out that another storage array, known to the ML model, would have provided more energy efficient performance. Depending upon the gap between actual and expected energy performance, a confidence score may be assigned to future predictions generated by the ML model. The confidence scores may serve as a guide for retraining the ML model, and/or for selection of a different ML model for future operations.

D.2 Example Method According to an Embodiment

With continued reference now to FIG. 2, details are provided concerning the example method 250. The following discussion applies specifically to the first scenario in which the storage array (A) 208 is selected, but is equally germane to the examples, of FIG. 2, in which the storage array (B) 208, and storage array (C) 208, are respectively selected.

Prior to performance of the example method 250, or as part of the example method 250, various user constraints and other information, such as SLA terms, may be, or have been, provided to the TEA module 206 to inform predictions to be generated by the TEA module 206. Additionally, or alternatively, the user constraints and other information may be provided by the host 202 when the host 202 sends data to the storage controller 204. For example, the host 202 may generate a storage request that includes the user constraints and information, and that also includes the data to be stored.

In an embodiment, the example method 250 may begin when the host 202 sends data 252 to the storage controller 204. As noted above, the data may be sent 252 as part of a request by the host 202. Rather than the storage controller 204 simply directing the data to one of the storage arrays 208, as in the comparative example of FIG. 1, the storage controller 204 instead sends a request 254 to the TEA module 206 to determine the 'best,' for example, the most energy-efficient, storage array 208 for the data identified by the host 202. The request sent 254 by the storage controller may, in an embodiment, include the applicable user constraints and information. Alternatively, if the TEA module 206 already has that information, the request sent 254 by the storage controller may simply identify the user, and the TEA module 206 may cross-reference that user to the application user constraints and information.

In the example presently under consideration, the TEA module 206 may identify, such as through an inferencing process for example, the storage array (A) 208 as the best choice, among the storage arrays (A), (B), and (C) 208, to store the data received from the host 202. The TEA module 206 may then communicate 256 this finding back to the storage controller 204.

The storage controller 204 may, but is not necessarily required to, act on the recommendation communicated 256 by the TEA module 206. In the example of FIG. 2 however, the storage controller 204 then transfers 258 the data to the storage array (A) 208, which then stores 260 the data.

Next, the storage array (A) 208 may acknowledge 262 back to the storage controller 204 that the data has been received and stored. Finally, the storage controller 204 may confirm 264 to the host 202 that the data has been stored in the storage array (A) 208.

It is noted that no particular size, type, or format, of data is required be employed in any embodiment. In one example embodiment, the method 250 may be performed on a chunk-by-chunk basis, although that is not required. In another embodiment, performance of the method 250 on a broader basis may reduce the total number of transactions involved in the data storage process. An embodiment may also strike a balance between the energy needed to implement communications among the participants in the method 250, and the energy expected to be saved by storing the data in a particular storage array 208. For example, if the cost of the energy to perform those communications exceeds the expect energy savings, and associated cost savings, of storing the data in a particular storage array 208, then the data may be stored elsewhere.

E. Example Methods

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising receiving, by a TEA (trustworthy energy awareness) module, a request from a storage controller to identify a most energy-efficient storage array, as among a plurality of storage arrays, on which to store a set of data; determining, by the TEA module based on energy efficiency information and user constraints, the most energy efficient storage array; and identifying, by the TEA module to the storage controller, the most energy efficient storage array.

Embodiment 2. The method as recited in any preceding embodiment, wherein the determining of the most energy efficient storage array is performed using a machine learning (ML) model of the TEA module.

Embodiment 3. The method as recited in embodiment 2, wherein the ML model is a trained ML model that was trained using historical information including a respective energy efficiency of one or more of the storage arrays.

Embodiment 4. The method as recited in any preceding embodiment, wherein the most energy efficient storage array is determined after the user constraints have been met.

Embodiment 5. The method as recited in any preceding embodiment, wherein the energy efficiency information comprises historical energy efficiency information and/or predicted respective energy efficiencies of the storage arrays.

Embodiment 6. The method as recited in any preceding embodiment, wherein the energy efficiency information is obtained from the storage arrays.

Embodiment 7. The method as recited in any preceding embodiment, wherein the data is a chunk of data.

Embodiment 8. The method as recited in any preceding embodiment, wherein the receiving, the determining, and the identifying, are each performed for each chunk of data in a group of chunks of data.

Embodiment 9. The method as recited in any preceding embodiment, wherein the storage arrays are elements of a distributed storage environment that spans multiple data owners and storage providers.

Embodiment 10. A system, comprising hardware and/or software, operable to perform any of the operations, methods, or processes, or any portion of any of these, disclosed herein.

Embodiment 11. A non-transitory storage medium having stored therein instructions that are executable by one or more hardware processors to perform operations comprising the operations of any one or more of embodiments 1-9.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
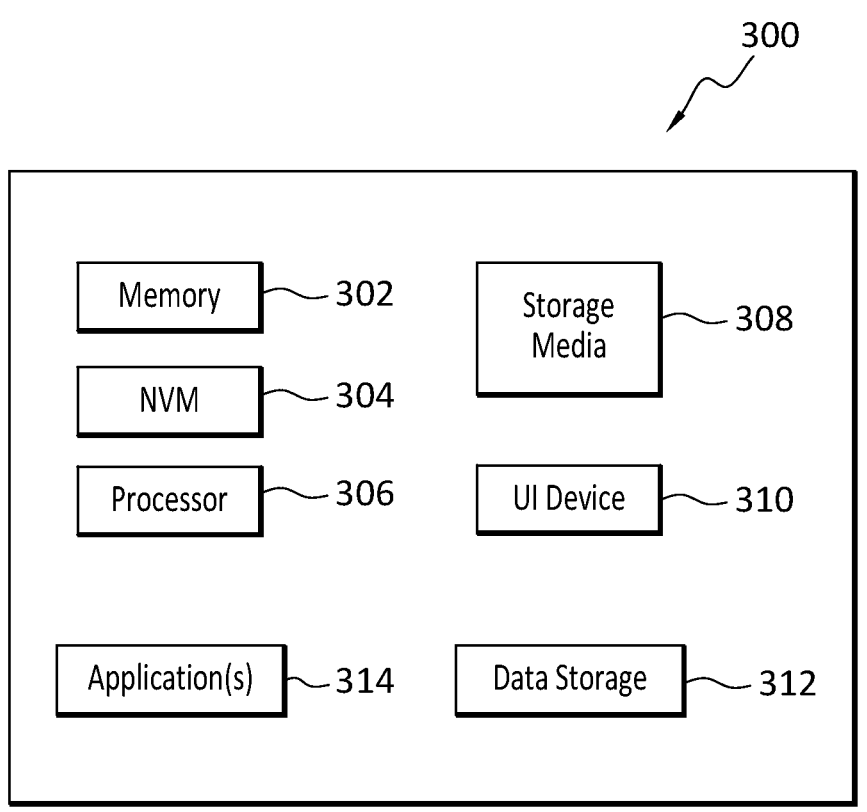
FIG. 3 discloses a computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

determining an anticipated energy cost for transmitting certain communications between a trustworthy energy awareness (TEA) module, a storage controller, and at least one storage array included among a plurality of storage arrays, wherein the certain communications are ones that are structured to identify a most energy-efficient storage array, as compared to other storage arrays included in the plurality of storage arrays;

determining an expected energy savings that is likely to occur as a result of using the most energy-efficient storage array to store a set of data;

determining whether the anticipated energy cost exceeds the expected energy savings;

in response to determining that the anticipated energy cost does exceed the energy savings, forgoing transmitting the certain communications so as to avoid expending the anticipated energy cost and instead storing the set of data in a selected storage array; and in response to determining that the anticipated energy cost does not exceed the energy savings:

receiving, by the TEA module, a request from the storage controller to identify the most energy-efficient storage array on which to store the set of data;

determining, by the TEA module based on energy efficiency information and user constraints, the most energy-efficient storage array;

identifying, by the TEA module to the storage controller, the most energy-efficient storage array; and storing the set of data on the most energy-efficient storage array.

2. The method as recited in claim 1, wherein the determining of the most energy-efficient storage array is performed using a machine learning (ML) model of the TEA module.

3. The method as recited in claim 1, wherein the most energy-efficient storage array is determined after the user constraints have been met.

4. The method as recited in claim 1, wherein the energy efficiency information comprises historical energy efficiency information and/or predicted respective energy efficiencies of the storage arrays.

5. The method as recited in claim 1, wherein the energy efficiency information is obtained from the storage arrays.

6. The method as recited in claim 1, wherein the data is a chunk of data.

7. The method as recited in claim 1, wherein the receiving, the determining, and the identifying, are each performed for each chunk of data in a group of chunks of data.

8. The method as recited in claim 1, wherein the storage arrays are elements of a distributed storage environment that spans multiple data owners and storage providers.

9. The method as recited in claim 2, wherein the ML model is a trained ML model that was trained using historical information including a respective energy efficiency of one or more of the storage arrays.

10. A non-transitory storage medium having stored therein instructions that are executable by one or more hardware processors to perform operations comprising:

determining an anticipated energy cost for transmitting certain communications between a trustworthy energy awareness (TEA) module, a storage controller, and at least one storage array included among a plurality of storage arrays, wherein the certain communications are ones that are structured to identify a most energy-efficient storage array, as compared to other storage arrays included in the plurality of storage arrays;

determining an expected energy savings that is likely to occur as a result of using the most energy-efficient storage array to store a set of data;

determining whether the anticipated energy cost exceeds the expected energy savings;

in response to determining that the anticipated energy cost does exceed the energy savings, forgoing transmitting the certain communications so as to avoid expending the anticipated energy cost and instead storing the set of data in a selected storage array; and in response to determining that the anticipated energy cost does not exceed the energy savings:

receiving, by the TEA module, a request from the storage controller to identify the most energy-efficient storage array on which to store the set of data;

determining, by the TEA module based on energy efficiency information and user constraints, the most energy efficient storage array;

identifying, by the TEA module to the storage controller, the most energy-efficient storage array; and storing the set of data on the most energy-efficient storage array.

11. The non-transitory storage medium as recited in claim 10, wherein the determining of the most energy-efficient storage array is performed using a machine learning (ML) model of the TEA module.

12. The non-transitory storage medium as recited in claim 10, wherein the most energy-efficient storage array is determined after the user constraints have been met.

13. The non-transitory storage medium as recited in claim 10, wherein the energy efficiency information comprises historical energy efficiency information and/or predicted respective energy efficiencies of the storage arrays.

14. The non-transitory storage medium as recited in claim 10, wherein the energy efficiency information is obtained from the storage arrays.

15. The non-transitory storage medium as recited in claim 10, wherein the data is a chunk of data.

16. The non-transitory storage medium as recited in claim 10, wherein the receiving, the determining, and the identifying, are each performed for each chunk of data in a group of chunks of data.

17. The non-transitory storage medium as recited in claim 10, wherein the storage arrays are elements of a distributed storage environment that spans multiple data owners and storage providers.

18. The non-transitory storage medium as recited in claim 11, wherein the ML model is a trained ML model that was trained using historical information including a respective energy efficiency of one or more of the storage arrays.

* * * * *